United States Patent
Deschler et al.

(10) Patent No.: US 12,220,970 B2
(45) Date of Patent: Feb. 11, 2025

(54) COOLING DEVICE FOR AN OBJECT AND METHOD FOR OPERATING A COOLING DEVICE FOR AN OBJECT

(71) Applicant: Diehl AKO Stiftung & Co. KG, Wangen (DE)

(72) Inventors: Florian Deschler, Achberg (DE); Joachim Lyszus, Baindt (DE); Thomas Herbert, Kempten/Allgäu (DE); Matthew Schwind, Kisslegg (DE); Andreas Maigler, Dieterskirch (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 26 days.

(21) Appl. No.: 18/192,345

(22) Filed: Mar. 29, 2023

(65) Prior Publication Data

US 2023/0331064 A1   Oct. 19, 2023

(30) Foreign Application Priority Data

Apr. 19, 2022   (DE) .................... 10 2022 109 395.6

(51) Int. Cl.
*B60H 1/32*   (2006.01)

(52) U.S. Cl.
CPC ....... *B60H 1/321* (2013.01); *B60H 2001/325* (2013.01); *B60H 2001/3254* (2013.01); *B60H 2001/3257* (2013.01); *B60H 2001/3261* (2013.01); *B60H 2001/3264* (2013.01)

(58) Field of Classification Search
CPC ............. B60H 1/321; B60H 2001/325; B60H 2001/3254; B60H 2001/3257; B60H 2001/2261; B60H 2001/3264; B60H 2001/3238; F24F 11/41; F25B 47/006; F25D 21/02
See application file for complete search history.

(56) References Cited

U.S. PATENT DOCUMENTS

| | | | | |
|---|---|---|---|---|
| 5,099,654 | A * | 3/1992 | Baruschke | F25B 5/00 62/186 |
| 10,704,823 | B2 * | 7/2020 | Onishi | F25D 21/006 |
| 10,914,504 | B2 * | 2/2021 | Schmitz | F25D 21/04 |
| 2013/0086929 | A1 * | 4/2013 | Senf, Jr. | F25B 47/02 62/80 |
| 2019/0170600 | A1 * | 6/2019 | Tice | G01M 3/2815 |
| 2022/0011044 | A1 | 1/2022 | Mullin et al. | |

FOREIGN PATENT DOCUMENTS

EP   2157380 A1   2/2010

* cited by examiner

*Primary Examiner* — Marc E Norman

(57) ABSTRACT

A cooling device for, for example, a cooling object has a refrigerant circuit with an evaporator, in which a cold air flow for the cooling object exchanges heat with the refrigerant, and a defrosting system for de-icing the evaporator. The defrosting system is controlled according to the degree of icing of the evaporator. The degree of icing of the evaporator is determined by the control unit of the defrosting system on the basis of the temperature of the cold air flow from the cooling object to the evaporator, the temperature and/or the operating pressure of the refrigerant upstream of the evaporator and at least one operating parameter of the compressor.

14 Claims, 1 Drawing Sheet

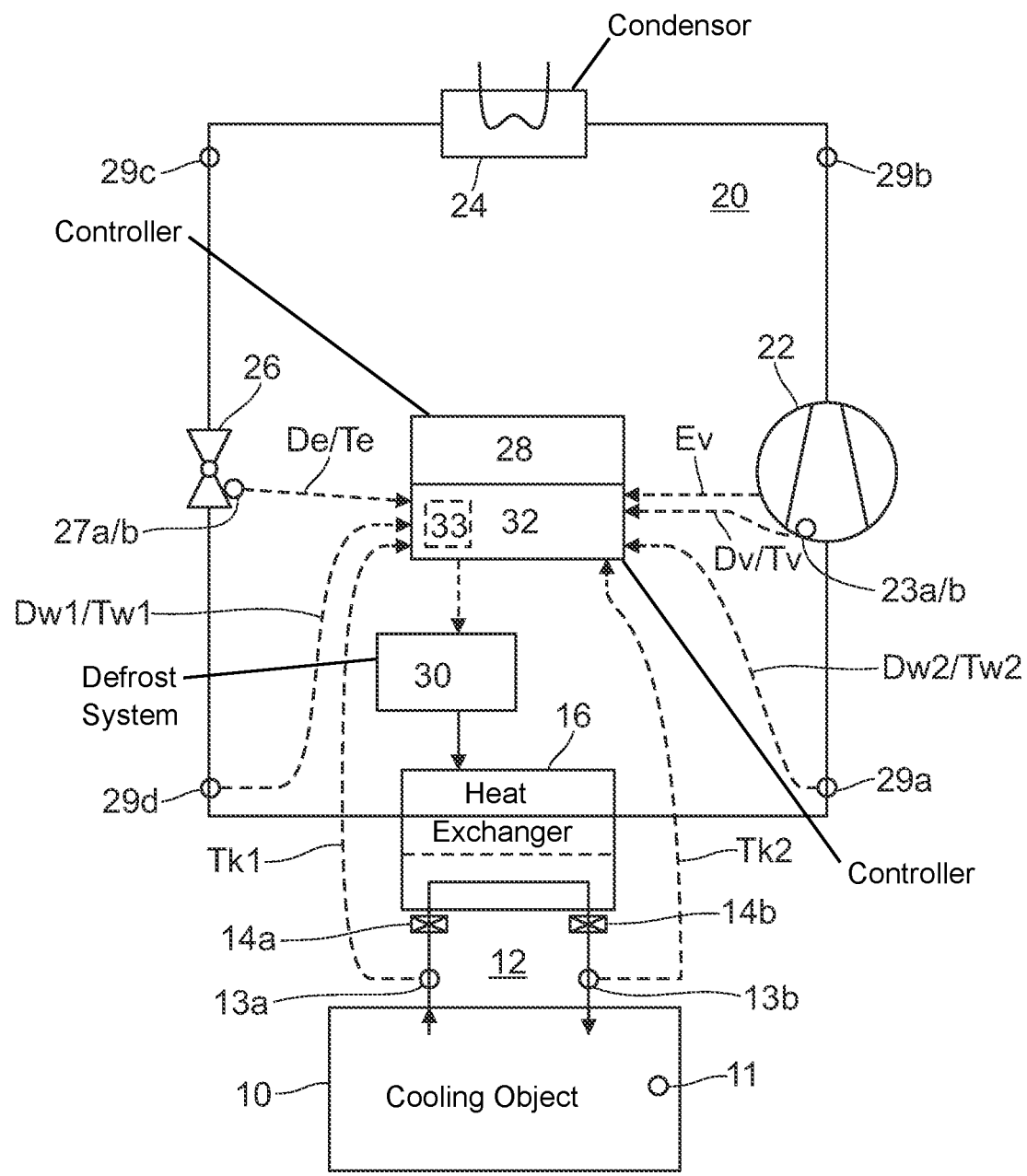

COOLING DEVICE FOR AN OBJECT AND METHOD FOR OPERATING A COOLING DEVICE FOR AN OBJECT

CROSS-REFERENCE TO RELATED APPLICATION

This application claims the priority, under 35 U.S.C. § 119, of German Patent Application DE 10 2022 109 395.6, filed Apr. 19, 2022; the prior application is herewith incorporated by reference in its entirety.

FIELD AND BACKGROUND OF THE INVENTION

The present invention relates to a cooling device for an object, in particular for cooling a cold air flow for an object, and to a method for operating such a cooling device for an object. The present invention is suitable, in principle, for any desired object such as, for example, cooling objects, refrigeration machines, heat pumps, heat generating systems and the like, but in particular advantageously for refrigeration units and freezer units in households and in particular in food markets.

In refrigeration and freezer units in food markets, a cold air flow is circulated around the food in order to keep the food cool enough to preserve. The cold air flow in this case is cooled in an evaporator/heat exchanger of a refrigerant circuit. This causes the water contained in the air to condense in the evaporator, as a result of which the evaporator can ice up in particular at low temperatures for freezer units. The icing-up of the evaporator also brings about a higher energy consumption by the evaporator and by the compressor in the refrigerant circuit. In order to keep the evaporator functional and fault-free and to maintain the effect of the cooling device and avoid a higher energy expenditure, such icing should be eliminated, which can be achieved by means of a defrosting process. In conventional cooling devices, the defrosting process is usually carried out on a time-dependent basis, for example at predetermined times or at predetermined time intervals, but as such takes place irrespective of the actual icing-up of the evaporator.

SUMMARY OF THE INVENTION

It is the object of the invention to provide an improved cooling device and an improved operating method for a cooling device for an object that allow a more reliable and effective de-icing of the evaporator to take place and therefore effectiveness to be more reliably guaranteed.

This object is achieved according to the invention by the subject-matter of the appended independent claims. Some advantageous configurations and developments of the invention are the subject-matter of the dependent claims.

A first aspect of the invention relates to a method for operating a cooling device for an object (e.g. cooling object). The cooling device has a refrigerant circuit with a compressor, a condenser, an expansion element and an evaporator, a cold air flow for the object exchanging heat with the refrigerant in the evaporator; and a defrosting system for de-icing the evaporator. According to the invention, the defrosting system is controlled according to the degree of icing of the evaporator (preferably the defrosting system is activated if the ascertained degree of icing exceeds a predetermined threshold value). Initiating the defrosting process as required in this way can lead to the defrosting process starting in optimum fashion and thereby also to energy consumption, energy costs and $CO_2$ emissions being reduced. According to the invention, the degree of icing of the evaporator is determined on the basis of the temperature of the cold air flow from the object to the evaporator, the temperature and/or the operating pressure of the refrigerant upstream of the evaporator and at least one operating parameter of the compressor. That is to say no specific additional sensors are installed in the evaporator in order to ascertain that the evaporator is iced up, rather sensors and operational monitoring systems that are generally present anyway can be used, the measured values from which, according to findings by the inventors, are able, in the specific combination, to serve as a basis for determining the degree of icing of the evaporator.

The method according to the invention is in principle advantageously able to be used for any desired objects (e.g. cooling objects, refrigeration machines, heat pumps, heat generating systems and the like) and also with any desired defrosting system. This operating method can preferably be used for refrigeration units and freezer units in households and in particular in food markets. Furthermore, the defrosting system for de-icing the evaporator can contain, for example, a heating element on the evaporator or a supply of heat, for example, from the compressor of the refrigerant circuit.

The at least one operating parameter of the compressor on which the determination of the degree of icing of the evaporator is based preferably includes at least one energy parameter (e.g. current draw and/or voltage requirement) of the compressor and/or the temperature of the refrigerant downstream of the evaporator and/or the operating pressure of the refrigerant downstream of the evaporator. The temperature of the refrigerant downstream of the evaporator is, for example, measured as the temperature of the refrigerant between the evaporator and the compressor or the temperature of the refrigerant at the compressor. The operating pressure of the refrigerant downstream of the evaporator is, for example, measured as the operating pressure of the refrigerant between the evaporator and the compressor or the operating pressure of the refrigerant at the compressor. The at least one operating parameter of the compressor can, for example, be evaluated in the form of its maximum value and/or its time characteristic.

The temperature of the refrigerant upstream of the evaporator can, for example, be measured as the temperature of the refrigerant at the expansion element or the temperature of the refrigerant between the expansion element and the evaporator. The operating pressure of the refrigerant upstream of the evaporator can, for example, be measured as the operating pressure of the refrigerant at the expansion element or the operating pressure of the refrigerant between the expansion element and the evaporator.

In one configuration of the invention, the degree of icing of the evaporator can be additionally determined on the basis of the temperature of the cold air flow from the evaporator to the respective object.

The degree of icing of the evaporator is preferably ascertained in accordance with the measured parameter data (i.e. at least temperature of the cold air flow from the object to the evaporator, temperature and/or operating pressure of the refrigerant upstream of the evaporator, and at least one operating parameter of the compressor) by a machine learning model, wherein the machine learning model can preferably train itself for the respective object.

A second aspect of the invention relates to a cooling device for an object, which cooling device has a refrigerant circuit for a refrigerant, which refrigerant circuit has a compressor, a condenser, an expansion element and an evaporator, a cold air flow for the object exchanging heat with the refrigerant in the evaporator; a first control unit for controlling the operation of the refrigerant circuit; a defrosting system for de-icing the evaporator; and a second control unit for controlling the defrosting system. According to the invention, the second control unit is configured to control the defrosting system according to the degree of icing of the evaporator (preferably to activate the defrosting system if the ascertained degree of icing exceeds a predetermined threshold value). According to the invention, the cooling device further has a cold air temperature sensor for measuring the temperature of the cold air flow from the object to the evaporator and a temperature sensor and/or operating pressure sensor for measuring the temperature and/or the operating pressure of the refrigerant upstream of the evaporator. The second control unit is configured to receive at least one operating parameter of the compressor (e.g. directly from the compressor or from the first control unit) and to determine the degree of icing of the evaporator on the basis of the measured temperature of the cold air flow from the object to the evaporator, the measured temperature and/or the measured operating pressure of the refrigerant upstream of the evaporator and at least one of the at least one received operating parameters of the compressor.

The advantages and possible applications of this cooling device according to the invention correspond to those of the operating method according to the invention, for which reason reference is simply made to the above explanations in relation to the method according to the invention.

The at least one operating parameter of the compressor to be received for determining the degree of icing of the evaporator preferably includes at least one energy parameter (e.g. current draw and/or voltage requirement) of the compressor and/or the temperature of the refrigerant downstream of the evaporator and/or the operating pressure of the refrigerant downstream of the evaporator. The at least one operating parameter of the compressor can be evaluated by the second control unit, for example, in the form of its maximum value and/or its time characteristic. For the purpose of measuring the temperature and/or the operating pressure of the refrigerant downstream of the evaporator, the cooling device further has, for example, a circuit sensor for measuring the temperature and/or the operating pressure of the refrigerant between the evaporator and the compressor and/or a compressor temperature sensor for measuring the temperature of the refrigerant at the compressor and/or a compressor operating pressure sensor for measuring the operating pressure of the refrigerant at the compressor.

For the purpose of measuring the temperature of the refrigerant upstream of the evaporator, the cooling device can further have, for example, an expansion element temperature sensor for measuring the temperature of the refrigerant at the expansion element and/or a circuit sensor for measuring the temperature of the refrigerant between the expansion element and the evaporator. For the purpose of measuring the operating pressure of the refrigerant upstream of the evaporator, the cooling device can further have, for example, an expansion element operating pressure sensor for measuring the operating pressure of the refrigerant at the expansion element and/or a circuit sensor for measuring the operating pressure of the refrigerant between the expansion element and the evaporator.

In one configuration of the invention, the cooling device can further have a cold air temperature sensor for measuring the temperature of the cold air flow from the evaporator to the object, and the second control unit can be configured to additionally determine the degree of icing of the evaporator on the basis of the measured temperature of the cold air flow from the evaporator to the object.

The second control unit for the defrosting system preferably further has a machine learning model for ascertaining the degree of icing of the evaporator in accordance with the measured parameter data (i.e. at least temperature of the cold air flow from the object to the evaporator, temperature and/or operating pressure of the refrigerant upstream of the evaporator, and at least one operating parameter of the compressor). This machine learning model is preferably configured to train itself for the respective object.

Other features which are considered as characteristic for the invention are set forth in the appended claims.

Although the invention is illustrated and described herein as embodied in a cooling device for an object and a method for operating the cooling device for an object, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

The subject-matter of the invention is defined by the appended claims. The above and further features and advantages of the invention will be better understood from the following exemplary description of a preferred, non-limiting exemplary embodiment with reference to the accompanying drawing. In the drawing.

BRIEF DESCRIPTION OF THE FIGURE

The sole FIGURE of the drawing is a schematic showing a design of a cooling device for a cooling object according to the invention.

DETAILED DESCRIPTION OF THE INVENTION

Referring now to the single FIGURE of the drawing in detail, there is shown, by way of example, a cooling object 10 (e.g. a freezer unit in a food market) in which a cooling object temperature sensor 11 is optionally present. The air in the cooling object is cooled by a cold air circuit 12 which runs from the cooling object to a heat exchanger (evaporator) 16 and back to the cooling object 10. The cold air circuit 12 has a cold air temperature sensor 13a for measuring the temperature of the cold air flow from the cooling object 10 to the heat exchanger 16 and a cold air temperature sensor 13b for measuring the temperature of the cold air flow from the heat exchanger 16 to the cooling object 10. Moreover, the cold air circuit 12 has a fan 14a for conveying cold air from the cooling object 10 to the heat exchanger 16 and/or a fan 14b for conveying cold air from the heat exchanger 16 back to the cooling object 10.

The heat exchanger 16 for cooling the cold air flow for the cooling object 10 is part of a refrigerant circuit 20 for a refrigerant (e.g. R134a). The refrigerant circuit 20 has a compressor 22, a high-side heat exchanger in the form of a condenser 24, an expansion element (e.g. expansion valve or throttle) 26 and a low-side heat exchanger in the form of an evaporator 16. The gaseous refrigerant is first compressed in the compressor 22 and then condensed in the condenser 24 while releasing heat (e.g. to the surroundings), and the expansion element 26 subsequently lowers the pressure of the liquefied refrigerant. In the subsequent evaporator 16, the refrigerant evaporates while absorbing heat at low temperature in order to then be compressed again in the compressor 12. The evaporator 16 of the refrigerant circuit 20 is used as a heat exchanger for cooling the cold air flow for the cooling object 10.

As shown in the FIGURE, the cooling device includes a first control unit 28 for controlling the operation of the components 16, 22, 24, 26 of the refrigerant circuit 20 and also the one or more fans 14a, 14b of the cold air circuit 12. Also present in the refrigerant circuit 20 are a plurality of circuit sensors 29a, 29b, 29c, 29d for measuring temperature and/or operating pressure and/or flow rate of the refrigerant at various points, which circuit sensors are connected (wirelessly or by wire) to the first control unit 28. The first control unit 28 controls in particular the cooling capacity of the refrigerant circuit 20 in order to meet a cooling requirement of the respective cooling object 10.

As shown in the FIGURE, the cooling device additionally has a defrosting system 30 for de-icing the evaporator 16 and a second control unit 32 for controlling the defrosting system 30. The second control unit 32 is preferably coupled to the first control unit 28 or integrated into the first control unit 28.

The second control unit 32 is configured to control the defrosting system 30 according to the degree of icing of the evaporator 16. The defrosting system 30 is preferably activated if the ascertained degree of icing exceeds a predetermined threshold value. The second control unit 32 determines the degree of icing of the evaporator 16 in accordance with a few parameters of the cooling device, which are recorded as sensor data, and preferably also using a machine learning model 33.

The determination of the degree of icing of the evaporator 16 is based at least on the temperature Tk1 of the cold air flow from the cooling object 10 to the evaporator 16, the temperature Te/Tw1 of the refrigerant upstream of the evaporator 16 and at least one operating parameter By of the compressor 22. Alternatively, or in addition to the temperature Te/Tw1 of the refrigerant upstream of the evaporator 16, the operating pressure De/Dw1 of the refrigerant upstream of the evaporator 16 can also be used for determining the degree of icing of the evaporator 16.

The temperature Tk1 of the cold air flow from the cooling object 10 to the evaporator 16 is, for example, measured by the cold air temperature sensor 13a in the cold air circuit 12 and sent to the second control unit 32. The temperature Te/Tw1 and/or the operating pressure De/Dw1 of the refrigerant upstream of the evaporator 16 are, for example, measured by a circuit sensor 29d between the expansion element 26 and the evaporator 16 as the temperature Tw1 and/or operating pressure Dw1 of the refrigerant between the expansion element 26 and the evaporator 16 and/or by an expansion element temperature sensor 27a as the temperature Te of the refrigerant at the expansion element 26 and/or by an expansion element operating pressure sensor 27b as the operating pressure De of the refrigerant at the expansion element 26.

The at least one operating parameter By of the compressor 22 preferably includes at least one energy parameter Ev (e.g. current draw and/or voltage requirement) of the compressor and/or the temperature Tw2/Tv of the refrigerant downstream of the evaporator 16 and/or the operating pressure Dw2/Dv of the refrigerant downstream of the evaporator 16. For example, the linear relationship between the current signals of two coils plotted over a period of time is calculated. The corresponding signal curve of the compressor changes depending on the operating pressure/temperature of the refrigerant at the compressor 22. The correlation, the correlation coefficient and the covariance of the individual coil signals in relation to one another are calculated here, for example. Moreover, the current signal or voltage signal or power signal can be Fourier-transformed and the maximum amplitude of the frequency spectrum can be ascertained. The energy parameter Ev of the compressor 22 can be picked off by the second control unit 32 either directly from the compressor 22 or can be picked off from the compressor 22 via the first control unit 28. The temperature Tw2/Tv of the refrigerant downstream of the evaporator 16 is, for example, measured by a circuit sensor 29a between the evaporator 16 and the compressor 22 as the temperature Tw2 of the refrigerant between the evaporator 16 and the compressor 22 and/or by a compressor temperature sensor 23a as the temperature Tv of the refrigerant at the compressor 22 and sent to the second control unit 32. The operating pressure Dw2/Dv of the refrigerant downstream of the evaporator 16 is, for example, measured by the circuit sensor 29a between the evaporator 16 and the compressor 22 as the operating pressure Dw2 of the refrigerant between the evaporator 16 and the compressor 22 and/or by a compressor operating pressure sensor 23b as the operating pressure Dv of the refrigerant at the compressor 22 and sent to the second control unit 32. The at least one operating parameter By of the compressor 22 can be evaluated by the second control unit 32 in the form of its maximum value and/or its time characteristic in order to determine, on the basis thereof, the degree of icing of the evaporator 16.

Optionally, the second control unit 32 can additionally determine the degree of icing of the evaporator 16 on the basis of the temperature Tk2 of the cold air flow from the evaporator 16 to the cooling object 10. The temperature Tk2 of the cold air flow from the evaporator 16 to the cooling object 10 is, for example, measured by the cold air temperature sensor 13b in the cold air circuit 12 and sent to the second control unit 32.

The subject-matter of the invention is defined by the appended claims. The exemplary embodiment explained above serves only for a better understanding of the invention and is not intended to limit the scope of protection defined by the claims. As will be apparent to those skilled in the art, yet further embodiments are also possible within the scope of the invention, in particular by omitting individual features from the above-described exemplary embodiment or by adding additional features thereto. Moreover, the inventive control of the defrosting system according to the degree of icing of the evaporator can also be advantageously used for objects other than the cooling object explained with reference to the FIGURE. The inventive principle of detecting icing works not only in the case of cooling objects or refrigeration machines but also in the case of heat pumps or systems for generating heat.

The following is a summary list of reference numerals and the corresponding structure used in the above description of the invention.

LIST OF REFERENCE NUMERALS

- 10 object (e.g. cooling object)
- 11 object temperature sensor
- 12 cold air circuit
- 13a cold air temperature sensor from object before evaporator 13b cold air temperature sensor after evaporator into object
14a fan for conveying cold air from object into evaporator
14b fan for conveying cold air from evaporator into object
16 evaporator
20 refrigerant circuit
22 compressor
23a compressor temperature sensor
23b compressor operating pressure sensor
24 condenser
26 expansion element
27a expansion element temperature sensor
27b expansion element operating pressure sensor
28 first control unit for refrigerant circuit
29a-d circuit sensors
30 defrosting system for de-icing the evaporator
32 second control unit for defrosting system
33 machine learning model
Bv operating parameter of the compressor
Ev energy parameter of the compressor
Te/De temperature/operating pressure of the refrigerant at the expansion element
Tk1 temperature of the cold air flow from object into evaporator
Tk2 temperature of the cold air flow from evaporator into object
Tv/Dv temperature/operating pressure of the refrigerant at the compressor
Tw1/Dw1 temperature/operating pressure of the refrigerant between expansion element and evaporator
Tw2/Dw2 temperature/operating pressure of the refrigerant between evaporator and compressor

The invention claimed is:

1. A method for operating a cooling device for an object, the cooling device having a refrigerant circuit with a compressor, a condenser, an expansion element and an evaporator, a cold air flow for the object exchanging heat with a refrigerant in the evaporator, the cooling device further having a defroster for de-icing the evaporator, which comprises the steps of:
controlling the defroster according to a degree of icing of the evaporator; and
determining the degree of icing of the evaporator on a basis of a first temperature of the cold air flow from the object to the evaporator, a second temperature and/or an operating pressure of the refrigerant upstream of the evaporator and at least one operating parameter of the compressor.

2. The method according to claim 1, wherein the at least one operating parameter of the compressor for determining the degree of icing of the evaporator includes at least one energy parameter of the compressor and/or a third temperature of the refrigerant downstream of the evaporator and/or a further operating pressure of the refrigerant downstream of the evaporator.

3. The method according to claim 2, wherein:
the third temperature of the refrigerant downstream of the evaporator is measured as a temperature of the refrigerant between the evaporator and the compressor or a temperature of the refrigerant at the compressor; and/or
the further operating pressure of the refrigerant downstream of the evaporator is measured as an operating pressure of the refrigerant between the evaporator and the compressor or an operating pressure of the refrigerant at the compressor.

4. The method according to claim 1, wherein:
the second temperature of the refrigerant upstream of the evaporator is measured as a temperature of the refrigerant at the expansion element or a temperature of the refrigerant between the expansion element and the evaporator; and/or
the operating pressure of the refrigerant upstream of the evaporator is measured as an operating pressure of the refrigerant at the expansion element or an operating pressure of the refrigerant between the expansion element and the evaporator.

5. The method according to claim 1, which further comprises further determining the degree of icing of the evaporator on a basis of a temperature of the cold air flow from the evaporator to the object.

6. The method according to claim 1, which further comprises ascertaining the degree of icing of the evaporator in accordance with measured parameter data by a machine learning model which trains itself for the object.

7. The method according to claim 1, which further comprises ascertaining the at least one parameter of the compressor directly at the compressor.

8. A cooling device for an object, the cooling device comprising:
a refrigerant circuit for a refrigerant, said refrigerant circuit having a compressor, a condenser, an expansion element and an evaporator, a cold air flow for the object exchanging heat with said refrigerant in said evaporator;
a first controller for controlling an operation of said refrigerant circuit;
a defroster for de-icing said evaporator;
a second controller for controlling said defroster, said second controller configured to control said defroster according to a degree of icing of said evaporator;
a cold air temperature sensor for measuring a temperature of the cold air flow from the object to said evaporator;
a temperature sensor and/or an operating pressure sensor for measuring a temperature and/or an operating pressure of said refrigerant upstream of said evaporator; and
wherein said second controller is configured to receive at least one operating parameter of said compressor and to determine the degree of icing of said evaporator on a basis of the temperature of the cold air flow from the object to said evaporator, the temperature and/or the operating pressure of said refrigerant upstream of said evaporator and the at least one operating parameter of said compressor.

9. The cooling device according to claim 8, wherein the at least one operating parameter of said compressor to be received for determining the degree of icing of said evaporator includes at least one energy parameter of said compressor and/or a temperature of the refrigerant downstream of said evaporator and/or an operating pressure of said refrigerant downstream of said evaporator.

10. The cooling device according to claim 9, wherein the cooling device, for measuring the temperature and/or the operating pressure of the refrigerant downstream of said evaporator, further comprising:
a circuit sensor for measuring a temperature and/or an operating pressure of said refrigerant between said evaporator and said compressor and/or a compressor temperature sensor for measuring a temperature of said refrigerant at said compressor and/or a compressor operating pressure sensor for measuring an operating pressure of said refrigerant at said compressor.

11. The cooling device according to claim 8, further comprising:
- an expansion element temperature sensor for measuring a temperature of said refrigerant at said expansion element and/or a circuit sensor for measuring a temperature of said refrigerant between said expansion element and said evaporator, for a purpose of measuring the temperature of said refrigerant upstream of said evaporator; and/or
- an expansion element operating pressure sensor for measuring an operating pressure of said refrigerant at said expansion element and/or a circuit sensor for measuring an operating pressure of said refrigerant between said expansion element and said evaporator, for a purpose of measuring the operating pressure of said refrigerant upstream of said evaporator.

12. The cooling device according to claim 8, further comprising a cold air temperature sensor for measuring a temperature of the cold air flow from said evaporator to the object, and wherein said second controller is configured to determine the degree of icing of said evaporator on a basis of the temperature of the cold air flow from said evaporator to the object.

13. The cooling device according to claim 8, wherein said second controller for said defroster further has a machine learning model for ascertaining the degree of icing of said evaporator in accordance with measured parameter data, wherein the machine learning model is configured to train itself for the object.

14. The cooling device according to claim 8, wherein the at least one parameter of said compressor is ascertained directly at said compressor.

\* \* \* \* \*